Aug. 4, 1964

R. M. BLUCK 3,142,960

MULTI-MATERIAL REFRACTORY ROCKET PARTS
AND FABRICATION METHODS

Filed July 6, 1961

INVENTOR.
RAYMOND M. BLUCK
BY
*Hill, Sherman, Meroni, Gross & Simpson*
ATTORNEYS Aug. 4, 1964 R. M. BLUCK 3,142,960
MULTI-MATERIAL REFRACTORY ROCKET PARTS
AND FABRICATION METHODS
Filed July 6, 1961 4 Sheets-Sheet 2

INVENTOR.
RAYMOND M. BLUCK
BY
Hill, Sherman, Meroni, Gross + Simpson
ATTORNEYS

Aug. 4, 1964

R. M. BLUCK

3,142,960

MULTI-MATERIAL REFRACTORY ROCKET PARTS
AND FABRICATION METHODS

Filed July 6, 1961

INVENTOR.
RAYMOND M. BLUCK
BY
Hill, Sherman, Meroni, Gross & Simpson
ATTORNEYS

United States Patent Office 3,142,960
Patented Aug. 4, 1964

3,142,960
MULTI-MATERIAL REFRACTORY ROCKET
PARTS AND FABRICATION METHODS
Raymond M. Bluck, Willowick, Ohio, assignor to Thompson Ramo Wooldridge Inc., Cleveland, Ohio, a corporation of Ohio
Filed July 6, 1961, Ser. No. 122,326
11 Claims. (Cl. 60—35.6)

This invention relates broadly to structures or parts for rockets or other applications requiring a wall and surface including a refractory part and with a high degree of resistance to severe ablating conditions of high temperature and high velocity flow of gas or the like thereover and to related methods of manufacture therefor.

More particularly, this invention relates to laminated and thin refractory including rocket engine throat portions, and the nose portions of rockets or missiles or other applications or structures to be exposed to normally destructive ablating conditions and to related processes for making such parts or assemblies thereof with other parts. Such parts have a finished and accurate, external or internal and often tapered or curved surface to be resistant to such ablating conditions.

It has been previously found that this resistance to severe ablating conditions and the resulting life of such parts or their said surface is materially increased and stronger and lighter such parts provided by the use of pressure molded and plastic bonded, ablation resistant fibers (particularly in a laminated type construction) with the exposed ends of such bonded together fibers defining such a resistant surface and such fibers being oriented to extend at least generally transversely to such a resistant surface and to the direction of gas flow thereover and, more particularly, with the buried lengths of such ablation resistant fibers trailing downstream at an acute angle to the direction of gas flow. While various types of such fibers (including suitable types of glass and asbestos, as examples only) have been found to be satisfactory for certain applications, yet it has proved desirable for particularly severe ablating conditions to use high silica fibers such as quartz or refrasil (glass reduced essentially to silica) because of their high molten viscosity and their slow vaporization or blow away rate in the high temperature gas stream thus giving them a high resistance to ablation and with their heat of melting cooperating in slowing down the ablation produced degradition of the surface structure.

Various known or suitable plastics (which, as examples only, may be various thermosetting plastics such as phenolic resins of the high temperature type or suitable phenol silane resins, as well understood by those skilled in this art) have been proposed to bond together such ablation resistant fibers or such high silica fibers to form a pyrolized carbonaceous wall and surface under ablation conditions. Such fibers may be used in any of various and usually plastic impregnated forms of yarns arranged in various ways including tapes of transverse yarns, woven cloth, batts, sleeving or other arrangement of cordage or yarn forms.

It is to be understood that such different types of fibers, bonding plastics, fiber orientations and fiber yarn arrangements or the like or other known or suitable such features are intended to be employed under the present invention.

If such bonded fibers are substantially parallel to the exposed surface (and lie either along or across the flow direction) they will have unduly high ablation rates due to the rapid degradation of the resin bonds and the release or blowing away of fibers lengths or portions thereof. Thus, it is desirable to have proper orientation of at least the major percentage of said fibers so that only their ends are exposed and their buried lengths are anchored in the cooler and still solid and strong matrix of fibers and plastic. Such orientation may be provided by having the fibers perpendicular to the exposed surface or to the flow direction although it is preferable, where feasible or where the shape permits, to have the exposed ends trailing downstream (as noted above) and, preferably, at angles of from 15 to 30° or more to such a surface and to the direction of the gas flow along such surface.

Also it has been previously known to wind ribbons or tapes of such fibers or yarns thereof over a desired conical or curved form mandrel by holding the tape at a desired orientation angle to the mandrel surface. Assemblies of such plastic impregnated fiber layers have also been made by stacking rings or the like precut from woven fabric or other fiber or yarn arrangements so that such rings or ring-like layers and their fibers may be axially bonded together, preferably with a substantial or major part of such fibers extending transversely or perpendicularly to the inner or outer exposed surface.

It is also known to low pressure mold and bond together either of the above noted fiber arrangements or other suitable fiber arrangements or assemblies at low pressures of from 50 to 400 lbs. per square inch as in an evacuated film or bag in an autoclave and with a suitable curing time. Such low pressure moldings generally require machining all over, including the exposed flow surface, to obtain the necessary accuracy and smoothness of the surfaces. The density and strength of such low pressure moldings are not as high as those from high pressure molding of such rocket parts and the orientations of the fibers are changed during the molding.

Better results, particularly for applications requiring resistance to severe ablation conditions or for high strength and light weight are obtained by high pressure molding in matched dies to provide finally finished surfaces not requiring any subsequent machining or finishing, particularly for at least the ablation exposed surfaces. Such molding is done at pressures of preferably over 2500 lbs. per square inch and preferably by axially guided travel for pressures applied axially or substantially axially of the gas flow direction or the axial length of the rocket part to thus provide a minimum of shifting of the desired fiber orientations from the previous fiber assembly and to give higher strengths and densities and, in certain cases, finally finished surfaces. Such high pressure molding is preferably used under this invention but is not essential for all applications.

Separate inserts have been used for regions of more severe ablation, such as the throat of a rocket nozzle. Such rocket throat inserts are usually one piece of solid material mechanically held or clamped in place. Such inserts of graphite have the most extensive history of all throat inserts and have maintained structural integrity through 60 second firings of severe ablation when used in sufficiently thick walls or in heavy sections of simple shape. However, throat erosion or increase in throat area does occur in graphite, probably due to mechanical ablation of the throat surface. Similar, separate, and mechanically clamped in place inserts of molybdenum have lasted up to about 40 seconds of firing under severe ablation in rockets but fail for longer firings, probably due to mechanical rupture and extrusion of the throat insert. Thus, these failures may be considered as being of a thermal mechanical nature. That is, the strength loss at the high temperature of ablating conditions is so nearly total that the holding or clamping of the throat insert is substantially impossible. Other proposed types of solid or composite material throat inserts or the like suffer from similar causes and from others including low thermal shock resistance, low mechanical strength, brittleness, difficulties in clamping or holding in place and, particularly, severe difficulties in fabrication or machining and final finishing to the required dimensional tolerances, particularly for the ablation exposed surface.

According to this invention the foregoing problems and difficulties are solved or avoided and the above noted, desirable features and methods may be advantageously combined with methods and means to avoid the solid inserts of graphite or the like. This invention also permits the use of high melting point and hard refractory materials in desired amounts and only where needed and in thin or small cross section members or elements interleaved with ablation resistant and supporting or strength material. Usually ablation resistant material includes a suitable bonding resin and suitable ablation resistant fibers or the like. Preferably such fibers are of a material to delay the penetration or advance of erosion, not only by the slow char and degradation of the resin but particularly by the endothermic action of the fiber material as is well understood by those skilled in this art.

Thus a multi-material, composite, or laminated and refractory containing insert for a high ablation region is provided which solves or avoids the above noted problems and difficulties since the thin refractory material is anchored or held in a dissimilar wall or matrix which precludes solid flow, extrusion, or collapse due to the gas pressure from the internal insulation or wall acting through the ablation resistant surface and also precludes rupture due to internal pressure and inadequate support of the external insulation or wall structure (which is subject to thermal degradation). As will be understood by those skilled in this art, such fibers may be used in any of various (and usually resin or plastic impregnated) arrangements or forms including yarns arranged in various ways such as tapes of transverse yarns, woven cloth, batts, or sleeving. Thus various different known types of fiber materials, proper fiber orientations of the types disclosed here, fiber or yarn arrangements or the like or other known or suitable such features are intended to be employed in this invention.

If the said ablation resistant fibers are substantially parallel to the exposed surface (and lie either along or across the gas flow direction) they will have unduly high ablation rates due to the rapid degradation of the resin bonds and the release of blowing away of whole fiber lengths or portions thereof.

The composite insert of this invention also permits commercially feasible machining and finishing of the thin or suitably small thickness refractory elements to desired accuracies and dimensional tolerances. In certain cases or where desired, such thin refractory elements may be end grain conformed to accurate molding dies for the molding of such inserts or the like to final dimensions or to surfaces not requiring further finishing.

The small cross sectional dimension or thin refractory elements are properly oriented transversely to the exposed surface and to the gas stream and are bonded and held in their oriented positions by a suitable strength matrix of ablation resistant material. These refractory members of hard and relatively unmachinable refractory material are thin or of small cross section to distribute the refractory only as needed for the several regions of different ablation intensity. Further their thinness or small cross sectional areas permit them to be machined when they are securely held in a wall as described above. Thus, a machinable and partly refractory rocket part or insert is provided. The same small thicknesses or transverse dimensions of the spaced and end grain disposed refractory elements may also permit them to be molded in place to form finally finished surfaces. Such thin members of refractory according to this invention are usually relatively bendable or flexible when free or separate and this feature cooperates in making them easily moldable, particularly when they are interleaved with different types of material such as the similarly oriented or parallel, ablation resistant fibers in a bonding resin as described in more detail below.

Any of various fine, thin, or small thickness forms of the refractory material may be employed under the broader aspects of this invention. Other and cooperating features and related fabrication methods are disclosed in more detail in the descriptions given in connection with the several illustrated embodiments. Test firings of rocket nozzle inserts according to this invention have exhibited substantially zero erosion under severe ablation conditions and a very high degree of structural integrity.

Accordingly, it is a general object of this invention to appreciate and to solve or to avoid the problems and difficulties previously known in connection with such insert portions or the like for regions of severe ablation and to provide such inserts and fabrication methods which not only solve or avoid such problems or difficulties but which may advantageously combine or include previously known and desirable features and methods in this art.

Another and general object hereof is to provide a composite or multi-material insert portion or the like, as well as related methods and larger structures or assemblies including such ablation resistant inserts, wherein such inserts comprise thin or small cross section refractory elements held in certain oriented and spaced apart positions by a different and ablation resistant and bonding strength material.

Another and more specific object hereof relates to the provision of such inserts to related methods in which the inserts are laminae in arrangement or form and compromise alternate and preferably axially or generally flow direction spaced and properly oriented layers of thin refractory material and of ablation resistant and holding, strength material.

Still another object hereof is to provide such a wall including spaced apart and thin refractory elements extending from, and generally transversely to, the exposed surface of said wall and the gas stream and particularly with bonding resin and similarly oriented and generally parallel ablation resistant and strength fibers between and spacing such refractory elements and to related fabrication methods therefor.

A further and more specific object hereof relates to the provision of positioning means refractory elements, and particularly for refractory sheets or foils, such positioning means to include spacers to act between such refractory elements and also to include anchoring means to help hold such elements in the strength matrix, particularly where they are smooth sheets or foils.

Other and more specific or detailed objects, features, and advantages of this invention will be apparent from the following disclosures.

The following more specific disclosures relate to only certain exemplary embodiments of this invention which are to be considered in conjunction with the accompanying drawings in which like reference characters refer to like parts throughout and wherein.

Figure 1:
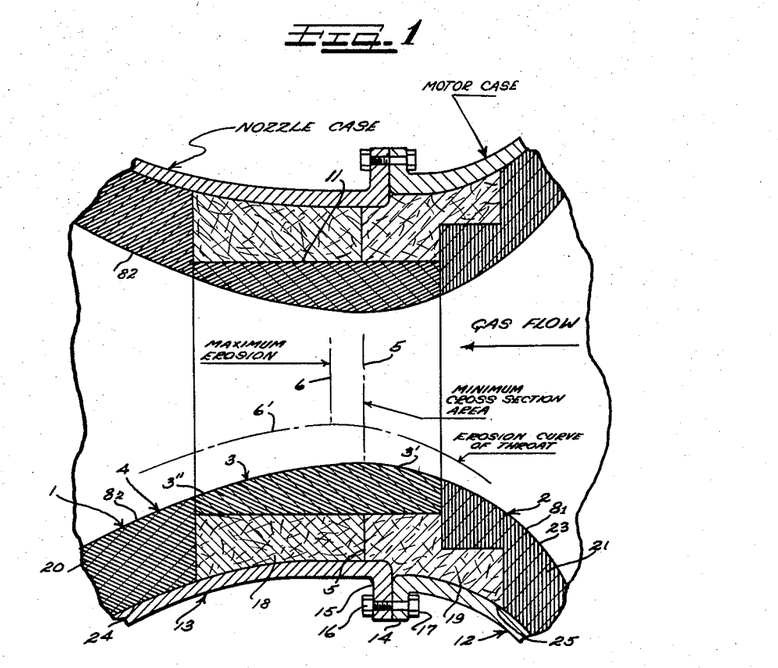
FIGURE 1 is an axial section through a round cross section rocket motor nozzle throat portion according to a first embodiment of this invention.

As a first and exemplary embodiment of this invention, FIGURE 1 shows a hollow and circular cross section, throat portion of a unitary rocket motor nozzle portion or the like designated as a whole by 1 and having the unitarily bonded or molded in place inner and outer axial end portions designated as wholes by 2 and 4 respectively. These end body portions 2 and 4 are integrally or suitably connected at each end of the throat insert designated as a whole by 3 and shown in greater detail in enlarged FIGURE 2.

The upstream and motor or container portion is shown as a whole by 2 and the downstream or expansion cone or nozzle portion is designated as a whole by 4. The throat insert 3 defines the region of the most severe ablation or structural destruction due to the high temperature and the high velocity gas flow which is on either side of, or adjacent to, the minimum cross sectional area plane 5. This erosion or destruction peaks or has a maximum located at a transaxial plane 6 which is slightly downstream from 5. This downstream maximum for the ablation is also illustrated by the erosion curve 6' in which the ordinants represent relative values of erosion or of ablation conditions along the axial length of the throat or along the gas flow direction.

Figure 2:
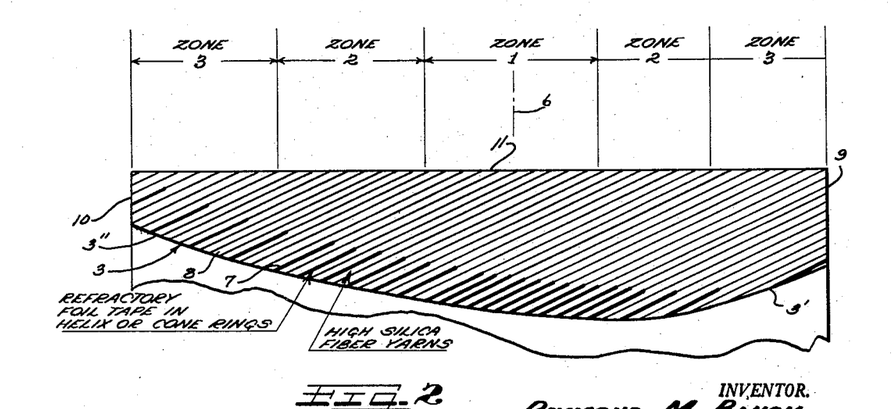
FIGURE 2 shows an enlarged portion of FIGURE 1.

As illustrated in this FIGURE 1 and in the enlarged insert portion thereof as shown in FIGURE 2, the fine or thin refractory elements are here shown as included in suitable layers or laminae 7 spaced apart and held by intermediate or alternating layers or laminae 8 of suitable ablation resistant and holding strength material. As more clearly shown in the larger FIGURE 2, the insert 3 has the ablation resistant and accurately finished, round cross section, inner throat surface tapering two ways from plane 5 and including the tapered and contracting or upstream portion 3' and the expanding or downstream tapered and curved portion 3", the outside 11, here shown as cylindrical, and the ends 9 and 10, here shown as squared off or perpendicular to the cylindrical wall surface 11.

Referring to FIGURE 1, this insert 3 is shown as suitably and firmly secured in place between the two axial end members 2 and 4 which meet or abut at the joining plane 5' which is preferably, and as shown here, located in the plane 5, or at the minimum cross sectional area of the throat. As somewhat schematically or generally illustrated in this FIGURE 1 but as will be well understood by those skilled in this art, the hollow walls of portions 2 and 4 include and are externally confined by the outer strength casings indicated as wholes by 12 and 13 respectively for portions 2 and 4. These casings 12 and 13 (which per se perform no part of this invention) may be of any suitable strong and temperature resistant material such as steel, other metals or of circularly wound fiber glass and plastic, all as is now well understood in this art.

As shown, the inner surfaces of members 13 and 12 fit or conform to the outer surfaces 24 and 25 of members 4 and 2. To this end such outer surfaces 24 and 25 may be formed by molding 2 and 4 by axially applied pressures while located inside of the casing members 13 and 12. These outer strength casings may be suitably and accurately indexed and strongly held together, as by the integral and thickened and radial wall portions or flanges 14 and 15 on portions 12 and 13 respectively together with fastening means such as the bolt and nut units or the like 16–17 extending through suitable holes in these flanges.

Preferably the molded insert 3 is formed first and secured in place as shown in FIGURE 1 in one of several fashions. For many purposes it is desirable to mold this insert 3 with cylindrical inner and outer walls and then machine and finish at least the thinner surface to the desired curve 3'–3". Alternatively, insert 3 may be molded (in one or more pieces) to its final dimensions, or approximately so by the assembly of a preform and its subsequent high pressure and axial molding in dies in a fashion similar to that described in connection with FIGURE 15 to thus provide the tapered end curved portions 3'–3" as molded to final dimensions or approximately so. This molded insert 3 may be secured in place to 2 and by bonding by a suitable bonding resin or plastic which may be similar to, or compatible with, the bonding resins used in the laminae 8 and as will be well understood by those skilled in this art. In this case, previously molded insert is secured in place between the separately and previously molded portions 2 and 4 which here each include their outer casing portions 12 and 13.

In other cases, the previously molded insert 3 is suitably held and indexed by male or inner die members and the outer end portions 2 and 4 are then molded in place around 3 and thus, at the same time, secured to it in a fashion similar to that described in connection with FIGURE 16. In this case portions 2 and 4 are also molded inside of their outer casing portions 12 and 13.

While for convenience of illustration and also for convenience of fabrication in many cases, the thin refractory elements are illustrated as being arranged or formed in laminae, yet it is to be understood that these thin refractory elements or members need not necessarily be so arranged so long as they are securely held and spaced apart by the matrix of ablation resistant material such as the bonding plastic and the strength fibers as described above.

In certain preferred forms of this invention, suitably thin layers, sheets, foils, tapes, strips or the like of high melting point, refractory materials are interleaved as single or multi-laminae with or between other laminae or layers of suitable ablation resistant and supporting or anchoring strength material. In certain cases the refractory laminae may not be continuous but include or comprise smaller refractory elements so long as the refractory material is suitably thin or of small cross sectional dimension as disclosed herein. Mixtures of different refractory forms may be used. Preferably, but not necessarily in all cases, the interleaved matrix comprises suitable bonding resins or plastics and end grain or end exposed and similarly oriented, ablation resistant fibers which may be of any suitable type, particularly of high silica materials to provide an endothermic resistance to the penetration of ablation as disclosed above. However such strength fibers may include other known fibrous materials for this purpose such, for example, as fiber glass or other organic or inorganic fibers of suitable strength and ablation resistance now known or used in this art. The preferred high silica fibers may, for example, be quartz or refrasil, which is glass reduced essentially to silica.

As noted above, the bonding plastics or resins may be of various thermosetting and temperature resistant types such as phenolic resins or phenol silane resins or other types suitable for such purposes as well understood by those skilled in this art. It is desirable that such plastics (together with the strength fibers) form a pyrolized carbonaceous wall which chars slowly under ablation conditions. Such wall structure supply insulation as well as strength.

These suitable ablation resistant and strength fibers or the like may be used or arranged in any of various known forms including various resin impregnated forms of yarns in woven cloth, sleeving, tapes and other cordage or yarn forms or arrangements or arrangements of fibers in non-yarn form such as batts or the like. In any such arrangements of the strength fibers, it is preferred that they be suitably oriented as disclosed herein and be in forms to permit their assembly and subsequent axial pressure molding. For such purposes it is preferred that these fiber laminae either be ring-like or helix-like winders with at least a substantial part of the fibers oriented as disclosed herein.

The refractory are elements arranged in, or themselves form, layers or sheet-like or foil-like members in tape or strip-like arrangements. They may be in various suitable configurations including ring-like forms, such as cones or flat rings, or helix-like windings (either continuous or in sections) to provide the downstream trailing, acute angle orientation disclosed in FIGURE 1 or the orientation wherein the laminae (and the major part of their elements) are substantially perpendicular to the stream direction (as disclosed, for example, in FIGURES 13, 15 and 16). In a such case all, or a major part, of the refractory elements have their ends or edges exposed at the said ablation resistance surface with the rest of each of the refractory elements buried and thus firmly held in the ablation resistance matrix of resin and strength fibers. Preferably, both the refractory layers or laminae and their elements and the similarly oriented, ablation resistant fibers are generally parallel. As noted above each is buried and securely retained in the wall structure to provide optimum resistance against being pulled out or blown away by the high velocity of gas flow.

While the refractory elements and their laminae may be refractory fibers, wires, or the like in various forms such as wire grids, cloths, or mats yet sheets, foils, strips, or the like are preferred. Such sheets or foils may be rolled or may be in the form of flame coats or fabricated in other known ways. They may be interrupted, cut, or perforated if desired.

In any case, such refractory elements should be thin, have a small thickness, or a small cross sectional dimension to permit their machining while firmly held in place and to permit their molding as noted above. Such dimensions may be as small as it is feasible to roll or otherwise form the refractory material such as a dimension as about one-hundredth of an inch for a practical minimum. The maximum such dimension or the upper limit is about six-hundredths of an inch. While any of the various known and suitable ablation resisting refractory materials may be employed under this invention yet it is preferred to use substances such as tungsten melting at 6120° F., zirconium carbide melting at 6390° F., hafnium nitride melting at 5990° F., hafnium carbide melting at 7020° F., or other high melting point refractory materials including beryllium intermetallics, cermets, thoria and other ceramics.

Normally it is not necessary that the refractory elements or their laminae extend entirely through the thickness of the wall. It is only necessary that they extend part way through as illustrated in the several figures herein. The depth of these refractory elements or laminae into the wall should be beyond the depth of char or of the degradation of the plastic during the firing. In the case of rocket nozzles, this should be approximately one-eighth of the throat diameter or, for example, one-half inch radial penetration into the wall in FIGURE 1 for a four-inch diameter nozzle.

Figure 3:
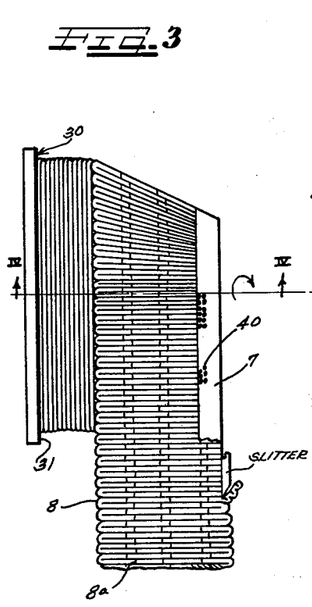
FIGURE 3 is an elevation showing a winding apparatus and method for assembling the two types of layers according to this invention.
Figures 4, 7:
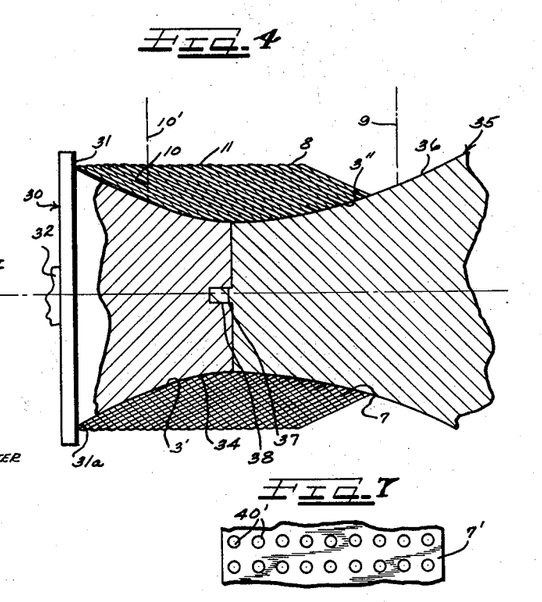
FIGURE 4 is an axial section taken on the line IV—IV of FIGURE 3.
FIGURE 7 is a view like FIGURE 5 but showing an alternate form of refractory tape.
Figures 10, 11, 12, 13, 14:
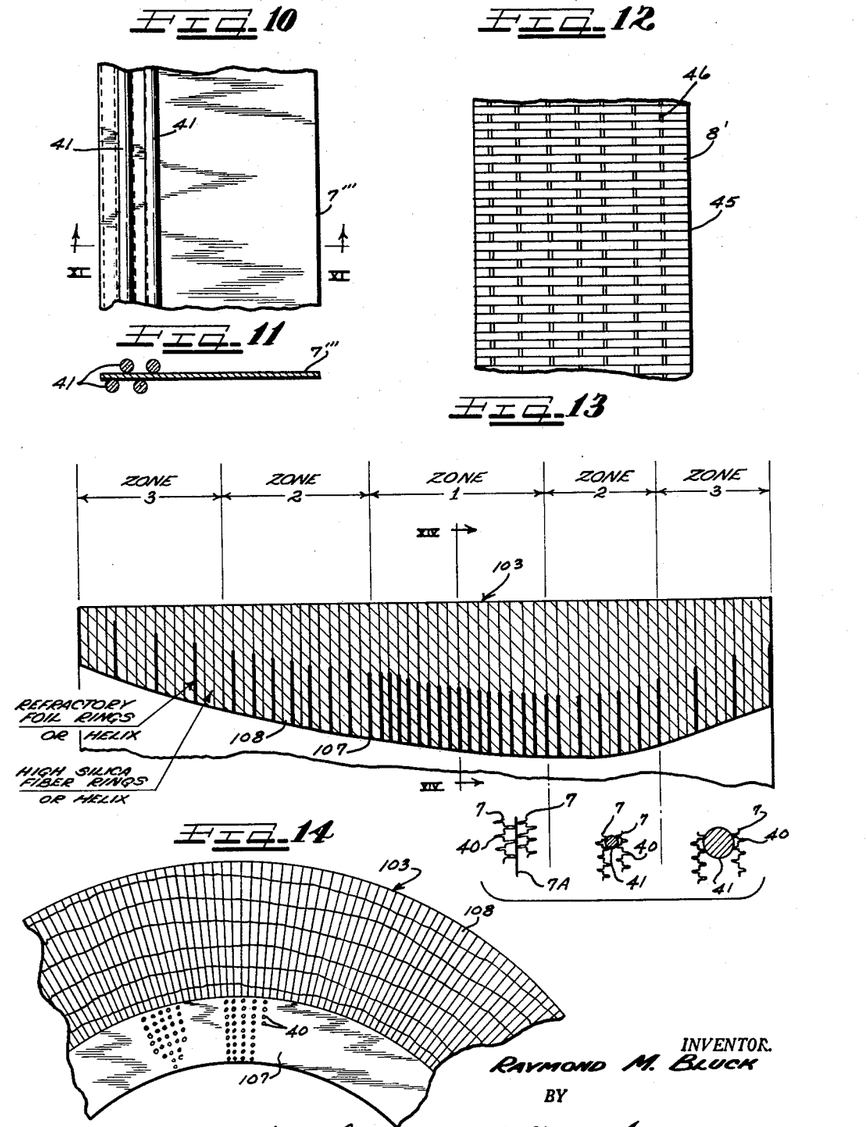
FIGURE 10 is also a view like FIGURE 5 but showing still another alternate form of such refractory tape.
FIGURE 11 is a section taken on the line XI—XI of FIGURE 10.
FIGURE 12 is an enlarged elevational view of an alternate form of the strip of ablation resistant fibers of FIGURE 3.
FIGURE 13 is a view like FIGURE 2 but showing another arrangement or embodiment of the throat insert bracketed to include enlarged details of the spacers for the three zones.
FIGURE 14 is a partial or broken away sectional view taken on the line XIV—XIV of FIGURE 13.

Turning again to FIGURE 1, the downstream trailing, refractory laminae 7 are interweaved with spacing laminae 8 which comprise suitable bonding resin or plastic and the generally parallel and generally oriented strength fibers, as shown in FIGURES 3 and 4 or in FIGURE 12 as examples.

Figure 15:
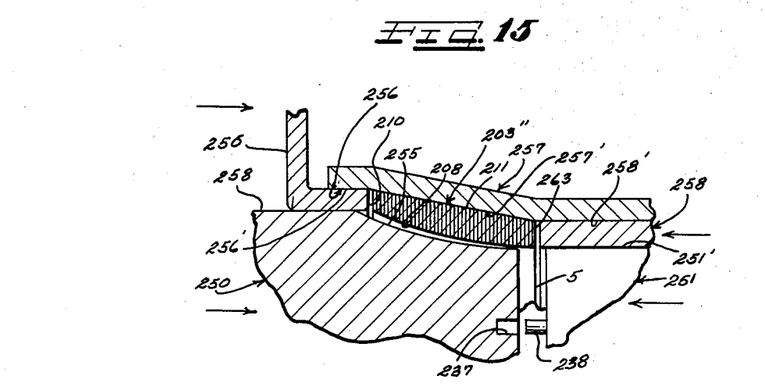
FIGURE 15 is a partial or broken away axial section showing another embodiment of the laminated refractory insert with one end thereof shown just after molding with the dies partly opened.

The refractory elements are preferably spaced apart or disposed only as needed to resist the differing ablating conditions. Thus, the refractory elements are preferably variably spaced. This spacing is shown as in a plurality of separate zones in FIGURES 1, 2 and 13 while FIGURES 14, 15 and 16 show progressive or gradually changing spacing. As shown in FIGURE 2, the spacing approximately doubles from zone 2 over zone 1 and from zone 3 over zone 2. In general, the spacing will depend upon the severity of the ablating conditions to be met and also upon the thickness and form of the refractory elements. Normally the spacing between refractory elements or their laminae such as 7, will always be greater than the thickness of the refractory elements as illustrated in FIGURE 2 for zone 1. Spacing means are provided to maintain this desired spacing in service and under the normally axially applied, molding pressures, examples of such spacing means are shown and described in connection with FIGURES 5 to 11 inclusive.

As shown in FIGURE 1, the body 2 may have its portion 19 formed of a plastic bonded but random directed, strength fibers to facilitate its conforming to the irregular shape during molding and particularly to give it a greater machinability when this is desired. Similarly, portion 18 of end of member 4 is also formed of random directed strength fibers. Motor case part 2 has its main body portion 21 and its exposed surface 23 formed of tapes of transversely disposed yarns $8_1$ which are similar to 8 of FIGURE 3 and are oriented so that the strength fibers extend generally perpendicularly to the axis (or the flow direction) and thus are trailing downstream with respect to the flow over the ablation exposed surface 23. Similarly, extension nozzle part 4 has its main body portion 20 and its surface formed of similar tapes of ablation resistant yarns $8_2$ which are here illustrated as oriented to trail downstream with respect to the axis or flow direction. They may be disposed at the same, or approximately the same, orientation angle as the laminae 7 and 8 of insert 3. These tapes or the like $8_1$ and $8_2$ may be arranged in a continuous helix-like winding substantially as shown in FIGURES 3 and 4 or they may comprise separate ring-like members such as cones or flat rings as described above.

FIGURES 3 and 4 illustrate one assembly method for the insert 3 and also a method for use in making of the preforms for other portions such as the end body portions 4 and 2. As shown the tape or strip comprising the back and forth arranged yarns of fibers (of quartz, refrasil, or other materials) is held together by suitable means such as a required number of longitudinally and interwoven threads or fibers illustrated by $8_a$. Such a tape or strip is helically wound onto a suitable mandrel of two parts designated as wholes by 30 and 35. Starting against the end stop surface 31 and initially winding along the true conical surface 31a, the tape 8 is cut to desired widths by suitable means, such as the slitter illustrated. One or more of these tapes 8 (as needed for the different zones or spacings) are interleaved with narrower refractory laminae strips 7. The two parts of the mandrel are axially indexed and connected as by the center pin and recess 38 and 37 respectively. These two mandrel parts 30 and 35 each have the accurately formed curved and tapering surfaces 34 and 36 conforming to the desired surfaces 3' and 3" of insert 3, which is here illustrated as partly wound on this two-piece mandrel. This winding operation provides a preform which may be suitably held together (as is well understood in this art) and then molded in dies by axially applied and preferably pressures in the order of 2500 to 6000 pounds per square inch with a minimum of about 2000 pounds per square inch to form a strong, dense structure wherein the refractory elements are securely held to permit their machining and to securely hold them in place in service.

Figure 5:
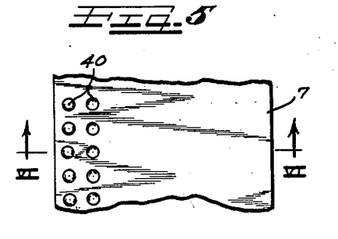
FIGURE 5 is an enlarged, elevational view of the refractory tape of FIGURE 3.
Figure 6:
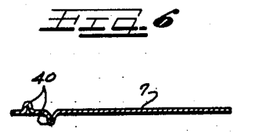
FIGURE 6 is a sectional view taken on the line of VI—VI of FIGURE 5.

FIGURE 5 shows one form of a single layer of foil or sheet-like strip 7 of refractory material having the positioning means 40. In certain cases under this invention, and particularly where the refractory elements are flat or smooth sheets, foils or the like, it is desirable to provide additional positioning means to serve as spacers to accurately determine the spacing between the refractory laminate during the axial pressures of molding and in service. Such positioning means may also supply anchoring or holding means to provide a greater interlock or engagement with the strength matrix and to help hold the refractory elements against being pulled out by the high velocity gas stream. Such spacers may be of various types, either integral or separate, and may extend throughout substantially the entire width of the laminae as shown in FIGURE 7 or be only at the inner buried portions as shown in FIGURES 5 and 6.

The anchoring or holding means may also be of various forms of integral projections or the like on or along the buried sides of the sheet or foil strips or other such refractory elements. It will be appreciated that the projections 40 of FIGURES 5 and 6, supply both of these functions. They are shown as providing the spacing in zone 1 of FIGURE 13 in cooperation with plain or non-embossed and alternated refractory strips 7A. In order to provide the wider spacings as in zones 2 and 3, different tapes having greater heights of projections 40 may be employed or means such as projections 40 may be employed in combination with additional spacer means such as the separate elements 41 of FIGURES 10 and 11. This last is shown for zones 2 and 3 of FIGURE 13. For simplicity of illustration, the spacers are not illustrated in FIGURES 1 and 2. Further, they need not be used in all cases.

FIGURE 7 shows the refractory sheet or foil tape 7' having the spacing and anchoring projections 40' extending substantially throughout its width.

Figure 8:
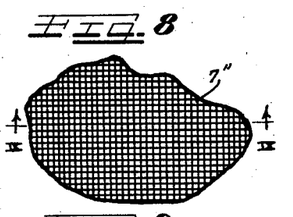
FIGURE 8 is also a view like FIGURE 5 but showing another alternate form of such refractory strip or tape.
Figure 9:
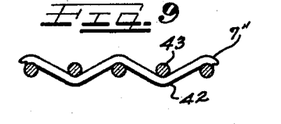
FIGURE 9 is an enlarged and sectional view taken on the line IX—IX of FIGURE 8.

FIGURES 8 and 9 show another form of refractory laminae, which may be in tape form like 7 of FIGURE 5. Here the laminae comprises one or more layers of a refractory wire cloth or grid 7" consisting of the longitudinally extending refractory wires or the like 43 and the transversely and interwoven wires or the like 42 which are thus oriented like the fibers or yarns 8 in FIGURES 2 or 13. It will be apparent that this form may supply its own spacing and/or anchoring means.

FIGURES 10 and 11 show still another refractory tape 7''' having refractory wire spacers 41 of suitable diameters which may be relatively offset on the two sides as shown and of differing diameters for the spacing in the several zones as described above. The refractory wires such as 41, may extend along the length of these refractory tapes 7''' and either be separate or else suitably secured in place to facilitate their assembly and to also permit them to serve as anchoring elements.

FIGURE 12 shows a short length of a strip 8' corresponding in general to the tape 8 of FIGURE 3 except that here the high silica fiber yarns are formed into a more conventional type cloth having the transversely extending yarns 45 and the smaller and wider spaced interwoven and longitudinally extending yarns 46. It will be understood that this strip may be used in lieu of the strip 8 of FIGURE 3.

FIGURE 13 shows an insert 103 similar to 3 of FIGURE 1 except that its laminae 107 and 108 (corresponding generally to 7 and 8 of FIGURES 1 and 2) are here disposed as oriented substantially perpendicular to the axis or to the central or main internal flow direction of the gas through the rocket nozzle. As indicated by the legend in FIGURE 13, both laminae 107 and laminae 108 may be formed by either separate rings or by a helix-like winding. In either case, they are axially molded as disclosed above and as indicated in connection with FIGURES 15 and 16. As shown in the transverse section 14 taken through FIGURE 13, the tapes 107 have the anchoring and spacing projections 40' like those of FIGURE 7 and which serve to both anchor them and also to space alternate flat laminae 107A and embossed laminae 107B in zone 1. In addition, the refractory wires such as 41 of FIGURE 11 may be used in cooperation with projections 40' to provide the additional spacing needed for the wider zones 2 and 3. Different diameters of wires may be provided for zones 2 and 3 or for their equivalents in a progressively changing spacing. It will be understood that projections or embossments such as 40 of FIGURE 5 or 40' of FIGURE 7 may be formed by stamping, embossing or the like. Where the laminae 108 of FIGURE 2 or 13 are formed by ring-like members, such as cones or flat rings, these ring-like members may be separate and formed of a woven cloth substantially as illustrated in FIGURE 14 and of the general type disclosed in FIGURE 12.

While the insert 3 is disclosed as being molded in one-piece in FIGURES 1, 2 and 13 yet it is to be understood that this insert may be of two or more pieces, particularly where they are axially joined. In fact, such a plurality of pieces may facilitate the assembly and molding of the complete rocket portion including this insert. FIGURE 15 shows the axial and high pressure molding of one end 203" of a complete insert. It may be molded to the final surface for its ablation exposed interior. Those two different types of laminae 207 and 208 of FIGURE 15 are illustrated as extending substantially perpendicularly with respect to the axis, like the laminae of FIGURE 13, although it will be understood that they may be angularly oriented as disclosed in FIGURES 1 and 2.

FIGURE 15 shows the downstream end 203" of the rocket throat insert just after it has been high pressure molded and with the dies partially pulled apart or opened for clarity of illustration. Here the central or inner end 263 of insert part 203" is preferably at the plane 5 or the minimum cross sectional area as shown in FIGURE 1. The male or internal and axially movable die plunger 250 has the straight or true cylindrical side portion 252 to match and slide relative to the similarly shaped interior of the outer female die sleeve designated as a whole by 256 and which is separately axially movable to press axially against the insert 203'. The cylindrical outer surface of female die member 256 fits in and slides in the cylindrical surface 256' at the end and on the inside of the external female die designated as a whole 257 and which is held fast, or moved axially in the opposite direction. That is, 257 has a relative axially motion with respect to die plunger 256. The inner end 263 of this insert part is held or else axially pressed in the opposite direction by the inner end of relatively axially movable and sleeve-like die member 258 fitting and sliding in the corresponding cylindrical surface 258' on the inside and at the other end of the die portion 257. Similarly, 258 has a cylindrical interior which fits and slides along the corresponding cylindrical surface 251' of the cylindrical die plunger member 251 at the other axial end. As shown, the internal male plungers 250 and 251 may be indexed together by means such as 237 and 238 like 37 and 38 of FIGURE 4. The operation of the die set and molding actions (together with the action of the true conical interior 257' of the external die 257 corresponding to the conical exterior 261 for the insert portion 203'') as above described will be apparent to those skilled in the molding art. This conical outer surface 211 of 203'' is preferably substantially parallel to the inner surfaces of 203'' so that the preform for 203'' has its laminae (whether wound or separate rings) pushed along toward the larger end of the curved tapered surface of 250 and thus fitted tightly and accurately thereto during the molding.

Figure 16:
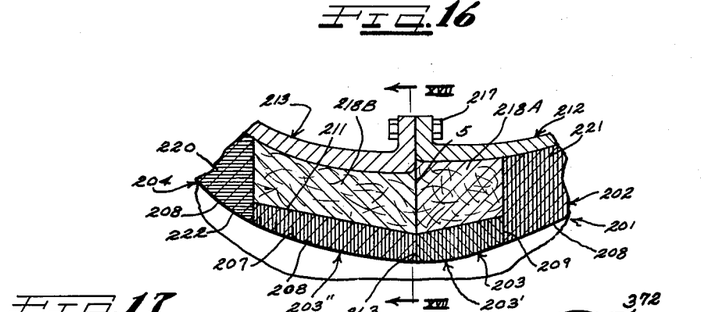
FIGURE 16 is a partial or broken away, axial sectional view showing the molded in place throat insert of FIGURE 15 in the interior of a rocket motor nozzle portion after molding and after the two axial end parts have been secured together.
Figures 17, 18:
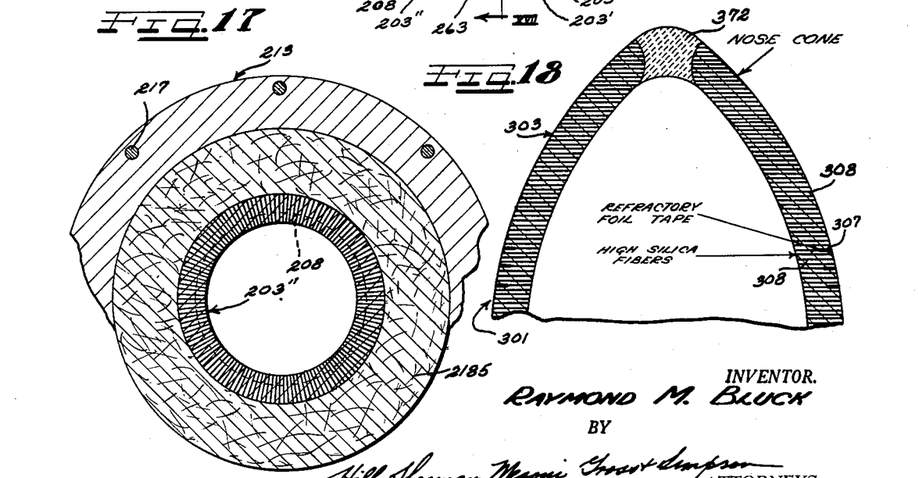
FIGURE 17 is a section taken on the line XVII—XVII of FIGURE 15.
FIGURE 18 is an axial section taken through a round missile rocket nose cone assembly according to another application of this invention.

FIGURES 16 and 17 show a multi or two-piece insert designated as a whole by 203. It includes downstream end portion 203'', which may be the same as that shown in FIGURE 3 and thus molded to provide the surface like 3'' of FIGURE 1 or else similarly molded with a plain conical or plain cylindrical inner surface which is then machined to provide the curve like 3'' of FIGURE 1. Insert 203 also includes upstream end portion 203' which may be similarly formed in either fashion and is axially joined or bonded to 203'' at their joining plane 263 which is preferably located at the minimum diameter or on the plane 5 of FIGURE 1. This joining is by a suitable bonding plastic or resin to provide the unitary bonded together unit 203. This previously made unit 203 may have its internal surfaces either completely finished or partly or approximately finished, in which case the internal surfaces may be machined to their final finish to match the corresponding and merging surfaces 223 and 222 of the end portions 202 and 204 respectively after the three parts 202, 203 and 204 have been molded together into a single unit.

In FIGURE 16, each of the insert portions 203'' and 203' have the external conical surfaces such as 211 of end part 203''. These conical surfaces are opposed as shown and preferably are each generally parallel to the inner curved surfaces of 203' and 203'' for the reasons given above. It will also be noted that, in this case, the strength fiber yarns $208_1$ of the portion 221 of 203 are here illustrated as being oriented to extend substantially perpendicularly to the axis (like yarns $8_1$ of FIGURE 1) while the corresponding yarns of the tapes $208_2$ of the portion 220 of the downstream portion 204 are disposed at 90° to yarns $208_1$ so that the yarns and fibers of laminae $208_2$ extend parallel to the axis which also orients them to the trailing downstream at their exposed ends with respect to the surface 222 and to the gas flow over the surface. This gas flow over the surface is parallel to the surface as is well understood by those skilled in this art. This coaxial and parallel arrangement facilitates the axial sliding of one ring or helix-like layer or laminae over the other during the axial and high pressure molding of this portion 220. These layers, or laminae $208_2$ may be separate cylinders or else helically wound up into the arrangement as shown. Either arrangement will permit this axial sliding during molding which thus maintains their predetermined and desired fiber orientation.

It will be understood that the outer casing portions designated as a whole by 212 and 213 are positioned over the suitably held together preforms for 221 and 220 and that these casing parts correspond substantially to the casing parts 12 and 13 of FIGURE 1 except that here the parting plane between them is preferably located at the plane 5 of FIGURE 1. The exterior surfaces of casing members 213 and 212 are suitably held and outwardly restrained by correspondingly shaped outer die members which are not illustrated here since they are well understood by those skilled in the molding art. It will also be understood that the two opposite or axial ends of portions 220 and 221 are axially pressed by suitable sleeve-like or female dies like 256 and 258 of FIGURE 15. These end pressing dies are slidably fitted between cylindrical surfaces on male inner dies generally like 250 and on the above mentioned outer restraining dies. The outer central portion about the outer conical surfaces of insert parts 203' and 203'' are filled with a suitable preform of random directed fibers and plastic as shown at 218A and 218B respectively to give a multidirectional strength and to facilitate the molding at this point. It will also be understood that if it is desired to machine the external surfaces at 218, such machining is facilitated by these random directed and molded fibers. Thus, the previously formed insert 203 is first high pressure molded in two parts and then each part united into one end part of a unitary molded structure. These two parts are then bonded and clamped together on the plane 5. This molding operation will be apparent with those skilled in the molding art since it is essentially similar to the molding of part 203'' as described above.

Thus 203' is molded into the random fiber 218 portion and the rest of 204 by an axially movable end presser die to engage at the plane 263 and thus act against the other axial and innermost die and to axially slide the cylindrical or axial layers at 220 and fit them over and tightly to the surface 234 by motion toward its larger end. This molds 204 up to plane 5 and in a fashion similar to the above described molding of part 203''. Then portion 202 is similarly molded and these two parts are bonded together at the plane 263 and the casings 212 and 213 connected as by their bolts or the like, which facilitates this bonding. In this case, the outer casings are fitted in outer dies as noted above. Other known methods for such molding may be used here.

FIGURE 18 shows another application of this invention which is here applied to a circular cross section nose cone for a missile, rocket, or the like designated as a whole by 301. It includes a nose insert or high ablation resistant portion designated as a whole by 303 which comprises the preferably solid refractory cap piece 372 shaped as shown and molded in place during the molding of the rest of this insert member which is, in turn, molded into place in the rest of the cone assembly as disclosed above in connection with FIGURES 16 and 17.

As shown in FIGURE 18, the interleaved laminae 307 and 308 of refractory and strength providing and ablation resistant material respectively are disposed perpendicularly to the axis so that they are also oriented at an acute angle to the ablation resistant surface and to the flow of gas over this surface. It will also be understood that these two different laminae may be trailing downstream with respect to the axis, if desired. These two types of laminae may be in the form of ring-like members, such as rings or cones, or in the form of helix winding, as disclosed above. Here the varying spacing between the refractory laminae progressively decreases axially toward the nose itself so that the several zones are not shown. It will, of course, be understood that the arrangement in separate zones may be employed here if desired. It is believed that the utility and methods of fabricating such a nose cone and its insert or laminated refractory portion will be apparent to those skilled in this art in view of the above disclosures.

Referring again to the broader aspects of this invention, it will be apparent that the teachings of this invention provide a considerable reduction in the thickness of such an insert over the thick and heavy sections required where the insert is of solid material such as graphite. This also results in a material savings in weight together with increases in strength. Accordingly, the size of the entire structure (including its outer metal casing portions 12 and 13) may be materially reduced.

It is also to be understood that the supporting and strength supplying, ablation resistant laminae may include mixtures of various materials. They may include such mixtures as refrasil with graphite cloth. Structures according to this invention are intended to be used for the well known plasma type jets and such flow is intended to be included by the references to streams of gas in this disclosure. The temperatures to be withstood during ablation conditions may be as high as 30,000° F. or more.

The ablation resistant layers comprise several different materials such as refrasil or quartz fibers with graphite cloth or woven tungsten wire (in addition to or, in lieu of, spacer members such as 41 of FIGURE 11). For example, such woven refractory wire is illustrated in FIGURES 8 and 9 and it is to be understood that it may be used interleaved with continuous sheets such as 7 of FIGURES 5 to 6 or FIGURE 7. It is also to be understood that where different refractory materials are used in combination with other materials such as an interleave of woven tungsten wire and graphite cloth or where different refractory materials are used together to produce deleterious chemical reactions, such as the formation of low melting point eutectics, that a suitable protective coating over the refractory elements may be employed, such as a coating of rhenium which melts at 5470° F.

It will be understood that thermal shock in inserts according to this invention will be materially less due to the lower rate of heat input and heat transfer. This is so because the thin refractory elements expose minimum areas to the high temperature and have a high ratio of such exposed area to their entire mass, which results in an appreciable time lag for such elements to reach their stabilization temperatures. In addition, cooling of the refractory elements will occur through several mechanisms. Heat will be drawn by conduction from these elements to degrade the organic binders such as the resin or plastic. The resulting gases will provide a boundary therealong the exposed surface of the insert or throat. More heat will be required from these refractory elements to melt the slowly melting and endothermic type ablation resistant fiber material, particularly in the case of quartz, refrasil or other high silica fibers. In addition, the heat needed to change the state of the silica or the like ablation resistant fibers (or to change them from liquid to vapor form) will also cool the refractory elements and the entire wall. In the case of elongated tapes or strips of refractory material (either in the form of closed rings or a helix-like winding) the severe structural loads imposed by three dimensional thermal expansion are reduced to essentially two dimensional loads thereby eliminating much of the high stresses at the hot exposed surface.

It is believed that other desirable features of this invention will be apparent to those skilled in this art.

Accordingly, it is to be understood that the devices and methods disclosed herein may be used for various other similar purposes and these may be various changes or modifications in the present teachings without departing from all of their advantages, all of which are intended to be embraced within the spirit and scope of this invention.

I claim as my invention:

1. A rocket nozzle throat having a converging-diverging surface to be directly exposed to ablation producing conditions of high velocity gas flow and high temperature comprising
   an edge exposed structure having
   (a) substantially paarllel and variably spaced apart sheet-like laminae,
   (b) said laminae each being a thin flexible strength providing, thermal shock resisting, unitary and yieldably non-brittle refractory resistant to said conditions,
   (c) said refractory laminae being interconnected and spaced apart by bonded alternate layers of bonding material,
   (d) said bonding material, positioned between said laminae, having a greater thickness than said laminae, and
   (e) means to bond and anchor said laminae in position to provide resistance against being pulled out of position by said conditions.

2. The rocket nozzle throat of claim 1 wherein the means to bond and anchor said laminae in position are a plurality of integral projections inwardly spaced from the edge exposed end thereof.

3. The rocket nozzle throat of claim 1 wherein the means to bond and anchor said laminae in position are a plurality of refractory wires connected to said laminae and inwardly spaced from the edge exposed end thereof.

4. A rocket nozzle throat having a converging-diverging surface to be directly exposed to ablation producing conditions of high velocity gas flow and high temperature comprising
   an edge exposed structure having
   (a) substantially parallel and variably spaced apart sheet-like laminae,
   (b) said laminae each being a thin flexible strength providing, thermal shock resisting, unitary and yieldably non-brittle refractory resistant to said conditions,
   (c) said refractory laminae being interconnected and spaced apart by bonded alternate layers of bonding material,
   (d) said bonding material positioned between said laminae, having a greater thickness than said laminae,
   (e) said bonding material comprising ablation resistant yarns therein,
   (f) said yarns having end exposed fibers with a major part of its fibers oriented to extend substantially parallel to each other and to extend transverse to the converging-diverging surface, and
   (g) means to bond and anchor said laminae in position to provide resistance against being pulled out of position by said conditions.

5. A rocket nozzle throat having a converging-diverging surface to be directly exposed to ablation producing conditions of high velocity gas flow and high temperature comprising
   an edge exposed structure having
   (a) substantially parallel and variably spaced apart sheet-like laminae,
   (b) said laminae each being a thin flexible strength providing, thermal shock resisting, unitary and yieldably non-brittle refractory resistant to said conditions,
   (c) said refractory laminae being selected from the group consisting of tungsten, zirconium carbide, hafnium carbide, hafnium nitride, thoria, beryllium inter-metallics, cermets and ceramics,
   (d) said refractory laminae each having a thickness of between 0.01 to 0.06 inch,
   (e) said refractory laminae being interconnected and spaced apart by bonded alternate layers of bonding material,
   (f) said bonding material, positioned between said laminae, having a greater thickness than said laminae, and means to bond and anchor said laminae in position to provide resistance against being pulled out of position by said conditions.

6. The rocket nozzle throat of claim 5 wherein said refractory laminae are axially spaced apart ringlike laminae providing hoop strength.

7. The rocket nozzle throat of claim 5 wherein said refractory laminae are an axial helix-like winding of a thin tape-like member providing hoop strength.

8. A rocket nozzle throat having a converging-diverging surface to be directly exposed to ablation producing conditions of high velocity gas flow and high temperature comprising
   an edge exposed structure having
   (a) substantially parallel and variably spaced apart sheet-like laminae,
   (b) said laminae each being a thin flexible strength providing, thermal shock resisting unitary and yieldably non-brittle refractory resistant to said conditions, (c) said refractory laminae being selected from the group consisting of tungsten, zirconium carbide, hafnium carbide, hafnium nitride, thoria, beryllium inter-metallics, cermets, and ceramics,
(d) said refractory laminae each having a thickness of between 0.01 to 0.06 inch,
(e) said refractory laminae being interconnected and spaced apart by bonded alternate layers of bonding material,
(f) said bonding material, positioned between said laminae, having a greater thickness than said laminae,
(g) said bonding material comprising ablation resistant yarns therein,
(h) said yarns having end exposed fibers with a major part of its fibers oriented to extend substantially parallel to each other and to extend transverse to the converging-diverging surface, and
(i) means to bond and anchor said laminae in position to provide resistance against being pulled out of position by said conditions.

9. A hollow rocket part having a surface to be directly exposed to ablation producing conditions of high velocity gas flow and high temperature comprising an edge exposed structure having
(a) substantially parallel and variably spaced apart sheet-like laminae,
(b) said laminae each being a thin flexible strength providing, thermal shock resisting, unitary and yieldably non-brittle refractory resistant to said conditions,
(c) said refractory laminae being interconnected and spaced apart by bonded alternate layers of bonding material,
(d) said bonding material, positioned between said laminae, having a greater thickness than said laminae, and
(e) means to bond and anchor said laminae in position to provide resistance against being pulled out of position by said conditions.

10. A hollow rocket part having a surface to be directly exposed to ablation producing conditions of high velocity gas flow and high temperature comprising an edge exposed structure having
(a) substantially parallel and variably spaced apart sheet-like laminae,
(b) said laminae each being a thin flexible strength providing, thermal shock resisting, unitary and yieldably non-brittle refractory resistant to said conditions,
(c) said refractory laminae being selected from the group consisting of tungsten, zirconium carbide, hafnium carbide, hafnium nitride, thoria, beryllium inter-metallics, cermets, and ceramics,
(d) said refractory laminae each having a thickness of between 0.01 to 0.06 inch,
(e) said refractory laminae being interconnected and spaced apart by bonded alternate layers of bonding material,
(f) said bonding material, positioned between said laminae, having a greater thickness than said laminae, and
(g) means to bond and anchor said laminae in position to provide resistance against being pulled out of position by said conditions.

11. A hollow rocket part having a surface to be directly exposed to ablation producing conditions of high velocity gas flow and high temperature comprising an edge exposed structure having
(a) substantially parallel and variably spaced apart sheet-like laminae,
(b) said laminae each being a thin flexible strength providing, thermal shock resisting, unitary and yieldably non-brittle refractory resistant to said conditions,
(c) said refractory laminae being selected from the group consisting of tungsten, zirconium carbide, hafnium carbide, hafnium nitride, thoria, beryllium inter-metallics, cermets, and ceramics,
(d) said refractory laminae each having a thickness of between 0.01 to 0.06 inches,
(e) said refractory laminae being interconnected and spaced apart by bonded alternate layers of bonding material,
(f) said bonding material, positioned between said laminae, having a greater thickness than said laminae,
(g) said bonding material comprising ablation resistant yarns therein,
(h) said yarns having end exposed fibers with a major part of its fibers oriented to extend substantially parallel to each other and to extend transverse to the surface, and
(i) means to bond and anchor said laminae in position to provide resistance against being pulled out of position by said conditions.

References Cited in the file of this patent

UNITED STATES PATENTS

| | | |
|---|---|---|
| 2,217,193 | Aronson | Oct. 8, 1940 |
| 2,334,257 | Egger et al. | Nov. 16, 1943 |
| 2,644,296 | Sanz et al. | July 7, 1953 |
| 2,726,977 | See et al. | Dec. 13, 1955 |
| 2,744,043 | Ramberg | May 1, 1956 |
| 2,783,173 | Walker et al. | Feb. 26, 1957 |
| 2,814,313 | Wate | Nov. 26, 1957 |
| 2,935,841 | Myers et al. | May 10, 1960 |
| 2,956,399 | Beighley | Oct. 18, 1960 |
| 2,987,880 | Kimmel | June 13, 1961 |
| 3,022,190 | Feldman | Feb. 20, 1962 |
| 3,026,806 | Runton et al. | Mar. 27, 1962 |
| 3,048,972 | Barlow | Aug. 14, 1962 |
| 3,070,957 | McCorkle | Jan. 1, 1963 |
| 3,081,705 | Warnken | Mar. 19, 1963 |

OTHER REFERENCES

"Astrolite" publication, H. I. Thompson Fiber Glass Co. Products Bulletin No. PB 7–24A, July 1, 1959. Pages 1–4 and 9 relied on.